US011953966B1

(12) United States Patent
Wu et al.

(10) Patent No.: US 11,953,966 B1
(45) Date of Patent: Apr. 9, 2024

(54) DATA-DRIVEN COLUMN-WISE CLOCK GATING OF SYSTOLIC ARRAYS

(71) Applicant: Meta Platforms Technologies, LLC, Menlo Park, CA (US)

(72) Inventors: Fan Wu, Redwood City, CA (US); Edith Dallard, San Mateo, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 92 days.

(21) Appl. No.: 17/721,252

(22) Filed: Apr. 14, 2022

Related U.S. Application Data

(60) Provisional application No. 63/282,122, filed on Nov. 22, 2021.

(51) Int. Cl.
*G06F 1/00* (2006.01)
*G06F 1/3237* (2019.01)
*G06F 15/80* (2006.01)
*G06F 1/3203* (2019.01)

(52) U.S. Cl.
CPC ........ *G06F 1/3237* (2013.01); *G06F 15/8046* (2013.01); *G06F 1/3203* (2013.01)

(58) Field of Classification Search
CPC .................... G06F 1/3237; G06F 15/8046
USPC ......................................................... 713/322
See application file for complete search history.

(56) References Cited

U.S. PATENT DOCUMENTS

| 9,231,674 | B1* | 1/2016 | Yang ................ H04B 7/0426 |
| 10,517,540 | B1* | 12/2019 | Anderson ............ A61B 5/30 |
| 11,347,916 | B1* | 5/2022 | Desai .................. G06N 3/063 |
| 11,501,145 | B1* | 11/2022 | Huynh ............... G06N 3/0464 |
| 2011/0010564 | A1* | 1/2011 | Thomas .............. G06F 7/728 |
| | | | 713/189 |
| 2016/0267111 | A1* | 9/2016 | Shoaib ............... G06F 16/283 |
| 2019/0227807 | A1* | 7/2019 | Martin ................ G06F 17/16 |
| 2020/0073911 | A1* | 3/2020 | Whatmough .......... G06F 7/523 |
| 2020/0192701 | A1* | 6/2020 | Horowitz .......... G06F 15/8046 |
| 2021/0097375 | A1* | 4/2021 | Huynh .................. G06F 7/50 |
| 2023/0237014 | A1* | 7/2023 | Kim .................. G06F 15/8046 |
| | | | 712/220 |

* cited by examiner

*Primary Examiner* — Volvick Derose
(74) *Attorney, Agent, or Firm* — Weaver Austin Villeneuve & Sampson LLP

(57) ABSTRACT

Methods and corresponding systems and apparatuses for saving power through selectively disabling clock signals in a systolic array are described. In some embodiments, a clock gate controller is operable to output a gated clock signal from which local clock signals of processing elements in the systolic array are derived. The gated clock signal corresponds to a root clock signal that is distributed through a clock distribution network or clock tree. The clock gate controller is located along one branch of the clock distribution network. The branch can be associated with processing elements that form a column within the systolic array. Disabling the gated clock signal disables the local clock signals along the entire branch, preventing any components that are clocked by those local clock signals from consuming power. Additional clock gate controllers can similarly be provided for other branches, including a branch associated with another column.

20 Claims, 10 Drawing Sheets

DATA-DRIVEN COLUMN-WISE CLOCK GATING OF SYSTOLIC ARRAYS

CROSS-REFERENCE TO RELATED APPLICATIONS

This application claims priority under 35 U.S.C. § 119 to U.S. Provisional Application No. 63/282,122, filed on Nov. 22, 2021, the contents of which are hereby incorporated by reference in their entirety for all purposes.

BACKGROUND

Systolic arrays are often used in neural network accelerators. The design of systolic arrays is conducive to data flow and organization of both matrix multiplication and convolution compute kernels, which are frequently featured in deep neural networks. Systolic arrays tend to suffer from low resource utilization due to the vast variety of inputs to each layer of a neural network (e.g., 3×3×1 tensors or 1×1×960 tensors). To support the large variety of possible inputs, which can vary in size and/or dimensionality, the input values to a systolic array frequently include a large quantity of zero values. In hardware, the modification of input data to include zero values may involve zero-padding the input to individual rows or columns of the systolic array. Although zero-padding tends not to have a significant overhead in terms of usage of the processing elements in the systolic array, zero-padding may nevertheless incur a penalty in terms of wasted power.

SUMMARY

The present disclosure relates generally to systolic arrays. More specifically, and without limitation, techniques disclosed herein relate to reducing power consumption in a systolic array through performing clock gating. In some embodiments, clock gating involves selectively disabling a clock input to an individual column (or row) of a systolic array when a data input to the column/row contains a zero. The column/row may correspond to a clock signal path through which clock signals are distributed to processing elements in the column/row. Each column/row may have its own clock signal path that can be disabled independently of other clock signal paths, although the clock signal paths may originate from a shared clock.

In an example, a system includes a systolic array and a clock distribution network. The systolic array includes a plurality of processing elements arranged in at least two dimensions, a first dimension corresponding to rows, and a second dimension corresponding to columns. Inputs to the systolic array include a separate input stream of input values at each column. The clock distribution network distributes a root clock signal to the plurality of processing elements and includes a clock gate controller. The clock gate controller is configured to pass the root clock signal as a gated clock signal from which local clock signals are derived for processing elements in a first column of the systolic array. The clock gate controller is further configured to disable the gated clock signal based on detecting a zero value at an input stream of the first column. The clock gate controller can optionally include a state machine implemented using combinational logic. The clock distribution network can optionally include a separate clock gate controller for each column of the systolic array, each clock gate controller being configured to pass the root clock signal as a respective gated clock signal.

In the example system described above, the input stream of the first column can be padded with one or more leading zeros. Additionally, for each leading zero in the input stream of the first column, an input stream of each successive column after the first column can also be padded at a corresponding position with a leading zero.

In the example system described above, the input stream of the first column can include weights or activations of a neural network. The plurality of processing elements can be configured to perform operations corresponding to a layer of the neural network, e.g., a convolution layer. For instance, each processing element in the first column can be configured to perform a multiply-accumulate operation in which a first value is multiplied by a second value, and where the first value is sequentially shifted through the processing elements in the first column.

In the example system described above, the clock gate controller can be further configured to disable the gated clock signal before any values are received at the input stream of the first column, and to keep the gated clock signal disabled until a non-zero value is received at the input stream of the first column. The non-zero value can be an initial value in a sequence of non-zero values.

In the example system described above, the clock gate controller can be further configured to enable the gated clock signal in response to detecting a non-zero value at the input stream of the first column, and to keep the gated clock signal enabled until an end of a computation being performed by the systolic array.

In the example system described above, each processing element in the first column can include one or more components that are clocked and one or more components that are not clocked. For instance, each processing element in the first column can include processing circuitry and a plurality of storage registers, where each storage register is controlled by a local clock signal of the processing element, and where the processing circuitry operates independently of the local clock signal.

In the example system described above, one or more processing elements of the plurality of processing elements can optionally include a local clock gate controller within the processing element. The local clock gate controller is configured to disable a local clock signal of the processing element based on detecting a zero value at a row input of the processing element.

In the example system described above, the systolic array can be configured to sequentially shift each input stream through a respective column to update a first input of a processing element in the respective column. The processing element in the respective column is configured to compute an output value using a value of the first input and a value of a second input. The processing element in the respective column is further configured to retain the output value and/or the value of the second input, for use in computing a subsequent output value based on an updated value of the first input.

Aspects of the example system described above may be implemented through a method performed by a clock gate controller in a clock distribution network. The clock gate controller may, for example, receive a root clock signal to be distributed to a plurality of processing elements in a systolic array, pass the root clock signal as a gated clock signal from which local clock signals are derived for processing elements in a first column of the systolic array, and disable the gated clock signal based on detecting a zero value at an input stream of the first column.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure relates generally to systolic arrays. More specifically, and without limitation, techniques disclosed herein relate to reducing power consumption in a systolic array through performing clock gating. In some embodiments, clock gating involves selectively disabling a clock input to an individual column (or row) of a systolic array when a data input to the column/row contains a zero. The column/row may correspond to a clock signal path through which clock signals are distributed to processing elements in the column/row. Each column/row may have its own clock signal path that can be disabled independently of other clock signal paths, although the clock signal paths may originate from a shared clock.

As discussed above, the input values to a systolic array frequently include a large quantity of zero values in order to support the ability to supply the systolic array with a variety of inputs that vary in size and/or dimensionality. Even within a single neural network, the matrices may vary in size, e.g., across different layers of the neural network. Feeding the systolic array zero values, which do not represent actual data to be processed as part of performing a computation, allows the hardware elements receiving the zero values or values derived therefrom to be kept active but unnecessarily consumes power. For instance, a memory register associated with a processing element (e.g., an output register storing the results of a partial computation by the processing element) that receives a zero input may unnecessarily consume power as a result of having a clock signal applied to the memory register.

Figure 5:
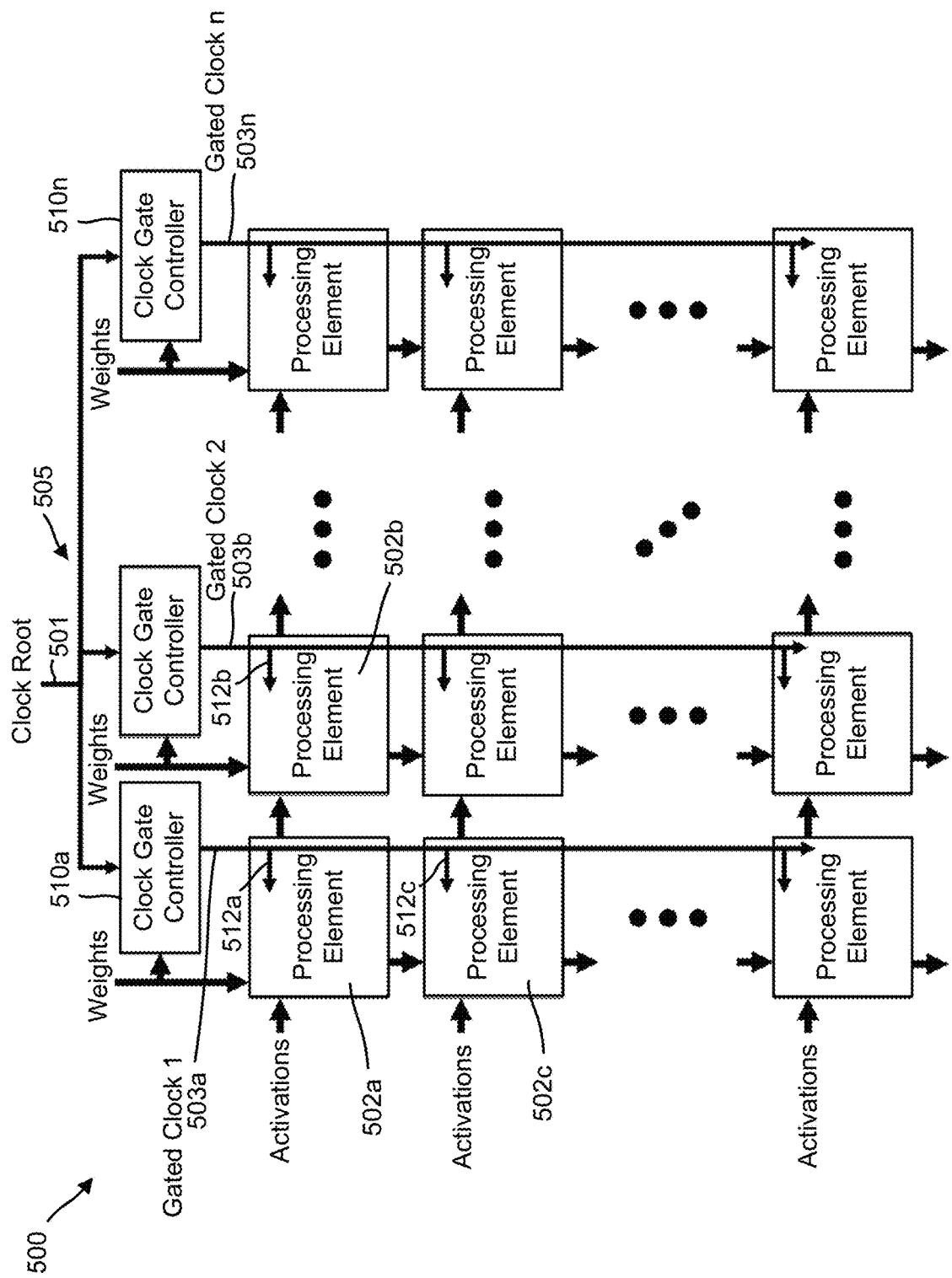
FIG. 5 shows a systolic array configured to support clock tree gating, according to some embodiments.

In some aspects, a system incorporating a systolic array includes a separate clock gate controller for each column and/or row of the systolic array. The clock gate controller may be integrated into the circuitry of the systolic array or be external to the systolic array (e.g., in a separate area of a system-on-chip or integrated circuit comprising the systolic array). The clock gate controller analyzes an input stream of data values to its corresponding column/row to determine whether the input is zero (logic level low). If so, the clock gate controller can disable (or keep disabled) a clock signal for the entire column/row. Alternatively, as shown in FIG. 5 (discussed below), the clock signal can be disabled before each computation. After disabling the clock signal, the clock gate controller can reenable the clock signal in response to detecting the first non-zero data value in the input stream. The clock signal can also be disabled after each computation is complete, in preparation for the next computation. In this manner, the clock signal may only be enabled once the input stream starts to include non-zero values.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

The term "clock tree" is used herein interchangeably with the term "clock distribution network." A clock distribution network distributes one or more clock signals from a common point to multiple destinations. Although a clock distribution network forming a tree is sometimes referred to as a clock tree, as used herein, the term clock tree can encompass a clock distribution network that does not form a perfect tree structure.

Aspects of the present disclosure relate to neural networks. In a neural network, input data can include an initial set of inputs and intermediate results produced by applying one or more activation functions. An intermediate result can be passed from one node of the neural network into another node of the neural network as an activation input. An activation function may involve a weighted sum, and a neural network can be configured with one or more sets of weight values. The weight values are generally derived through pretraining the neural network and, in some instances, may be updated through retraining. Accordingly, while weights can be considered as being input parameters of a neural network, the term "input" is sometimes used herein to refer specifically to an activation. For instance, an activation value may be referred to as an "input value."

Figure 1:
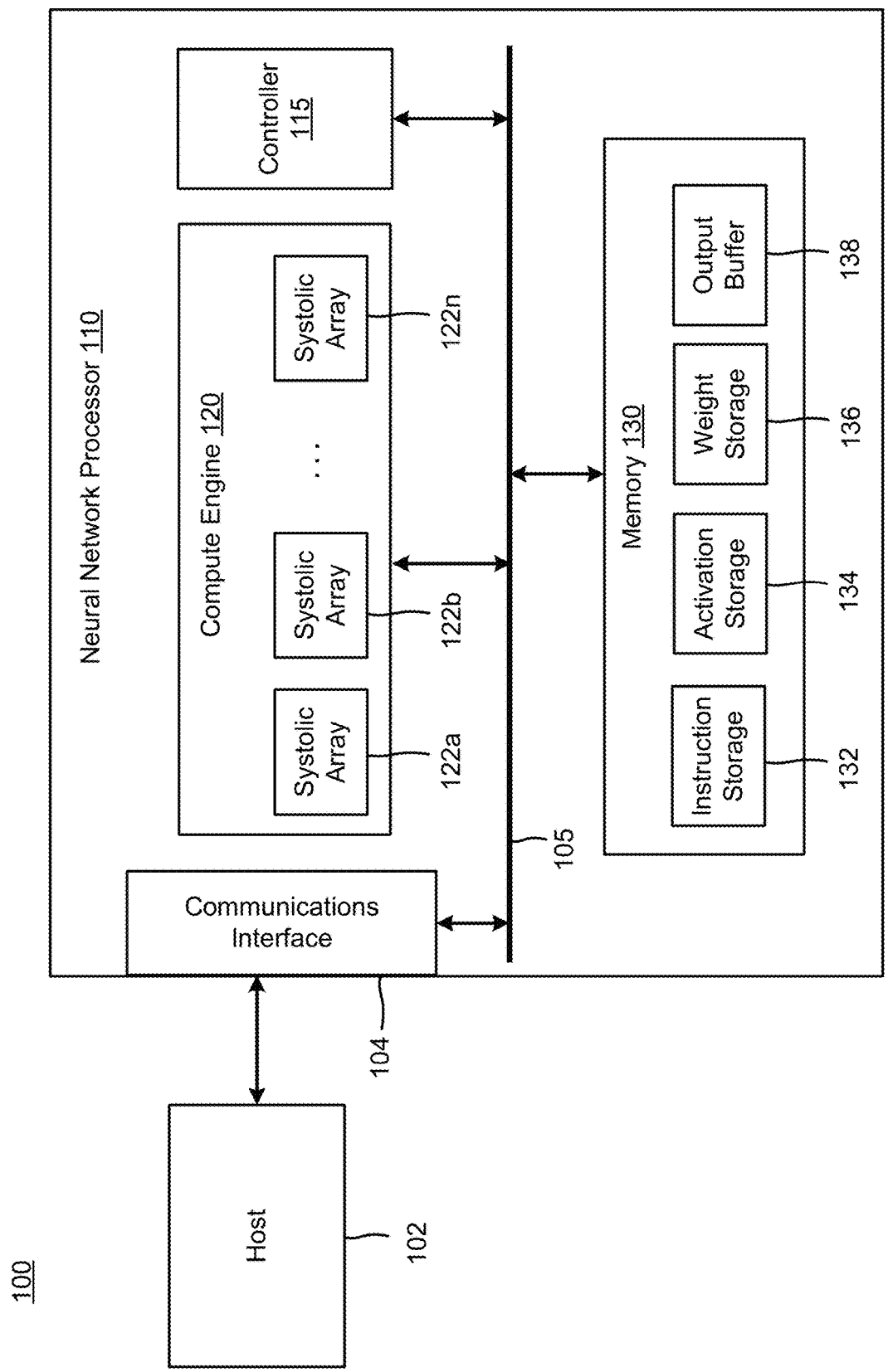
FIG. 1 shows a block diagram of an example computing environment in which one or more embodiments of the present disclosure can be implemented.

FIG. 1 shows a block diagram of an example computing environment 100 in which one or more embodiments of the present disclosure can be implemented. The computing environment 100 includes a host communicatively coupled to a neural network processor (NNP) 110. Although FIG. 1 shows the host 102 and the NNP 110 as being directly connected, host 102 and NNP 110 may be coupled via one or more intervening devices, including devices that form one or more communications networks. The one or more communications networks can include a wireless network, a wired network, or both.

Computing environment 100 can include a distributed computing system in which the host 102 is implemented as a general purpose computer, such as a desktop computer, a laptop computer, a server, and the like. Alternatively, computing environment 100 can be implemented as a system-on-chip (SOC) or other hardware arrangement in which a device providing instructions for execution (e.g., host 102) and a device executing those instructions (e.g., NNP 110) are co-located on the same circuit board. In some implementations, the host 102 and the NNP 110 are separate integrated circuits housed in a single device.

Host 102 may include one or more processors (e.g., a Central Processing Unit (CPU)), volatile and/or non-volatile memory (Random Access Memory (RAM), Read-Only Memory (ROM), flash memory, etc.). Host 102 may further include a communications interface (e.g., a network interface) configured to send and receive communications between the host and a corresponding communications interface 104 of the NNP 110. The communications sent between the host 102 and the NNP 110 can include instructions for execution by the NNP 110. Such instructions may include instructions corresponding to operations performed by a neural network, for example, matrix multiplication operations, convolution operations, multiply-accumulate operation, and/or the like. Additionally, the host 102 may receive results of processing performed by the NNP 110, for example, data values corresponding to the output of the final layer of a neural network or, in some instances, output of an intermediate layer. Host 102 may also supply the NNP 110 with input data and/or parameters of the neural network. Accordingly, the host 102 may be configured to program the NNP 110 to execute a neural network. In some implementations, NNP 110 may be configured to process image data captured by an image sensor of a Head Mounted Display (HMD). The NNP 110 may process the image data in connection with a virtual reality, augmented reality, or mixed reality application and in accordance with, for example, the operations shown in FIG. 2, described below. However, the NNP 110 may be configured to operate on other types of data, for example, audio.

NNP 110 may include a controller 115, a compute engine 120, and a memory 130. The various components of the NNP 110 may communicate through a shared bus 105 or, in some instances, direct connections. As shown in FIG. 1, the compute engine 120 can include multiple systolic arrays 122a to 122n. Each systolic array 122 includes a network of processing elements, elements which are sometimes referred to as data processing units (DPUs). The processing elements can be hardwired or programmed to perform a specific mathematical operation. In general, the processing elements within any particular systolic array are configured to perform the same operation but using different input data. A systolic array 122 can be a two-dimensional (2-D) array of processing elements arranged into multiple rows and multiple columns. Row inputs may be provided in parallel as a set of input streams. Likewise, column inputs may also include parallel input streams. As used herein, a row refers to any arbitrary dimension along a systolic array, and a column refers to a second dimension different from that of a row. Although not specifically described herein, a systolic array incorporating one or aspects of the present disclosure is not limited to a two-dimensional array and can, for example, be three-dimensional (3-D).

To execute a neural network, activation values may be provided as input to processing elements along a first dimension (e.g., row inputs), and weight values may be provided as input to processing elements along a second dimension (e.g., column inputs). The processing elements are controlled using clock signals. Each processing element generally operates with a timing determined by a respective local clock signal. As described below, the local clock signals controlling the various processing elements within a systolic array can be generated using a clock tree, as signals derived from a common or master clock. The processing elements are interconnected such that over the course of multiple clock cycles, input data and/or processing results are passed or shifted from one processing element to another, e.g., down a row or down a column. Depending on the configuration of the systolic array 122, some data may be retained within a processing element across clock cycles while other data gets shifted. Examples of such data flow are described below and can generally be classified as input stationary, output stationary, or weight stationary.

Controller 115 configures the compute engine 120 to execute a neural network, e.g., based on instructions and parameters communicated to the NNP 110 from the host 102. The controller 115 can schedule the processing performed by the systolic arrays 122 to realize different layers of the neural network. For instance, the controller 115 may select a first set of systolic arrays 122 for performing operations corresponding to an input layer of the neural network. The controller 115 may cause the output of the first set of systolic arrays to be processed by a second set of systolic arrays that perform operations corresponding to the next layer of the neural network, and so on until the final output of the neural network is generated. The systolic arrays 122 can support a variety of input data depending on the neural network to be executed or the operation to be performed. The size and/or dimensionality of the input data is subject to change across different execution instances of the NNP 110 and even across layers of the same neural network. As discussed above, supporting a variety of inputs may, in some instances, require zero-padding of the input data.

Memory 130 can include an instruction storage 132, an activation storage 134, a weight storage 136, and an output buffer 138. Each of these storage elements 132, 134, 136, and 138 can be realized using one or more memory devices. As described below, individual processing elements within a systolic array can include local storage. The memory 130 can operate as a central source of input data and output data for the compute engine 120. The instruction storage 132 may hold program instructions communicated from the host 102. The controller 115 can process the program instructions to configure the compute engine 120 accordingly. Activation storage 134 may include memory for holding activation values. Similarly, weight storage 136 may include memory for holding weight values. In some instances, the activation values and/or weight values may be supplied by the host 102. However, the NNP 110 can be preconfigured with input, for example, with the weight storage 136 holding one or more weight matrices that correspond to a pretrained neural network. The output buffer 138 may operate as a temporary storage area for results of the processing performed by the compute engine 120, e.g., a set of values corresponding to the output of the final layer of a neural network. The contents of the output buffer 138 can be subjected to further processing by the compute engine 120 and/or communicated as output data to the host 102.

Figure 2:
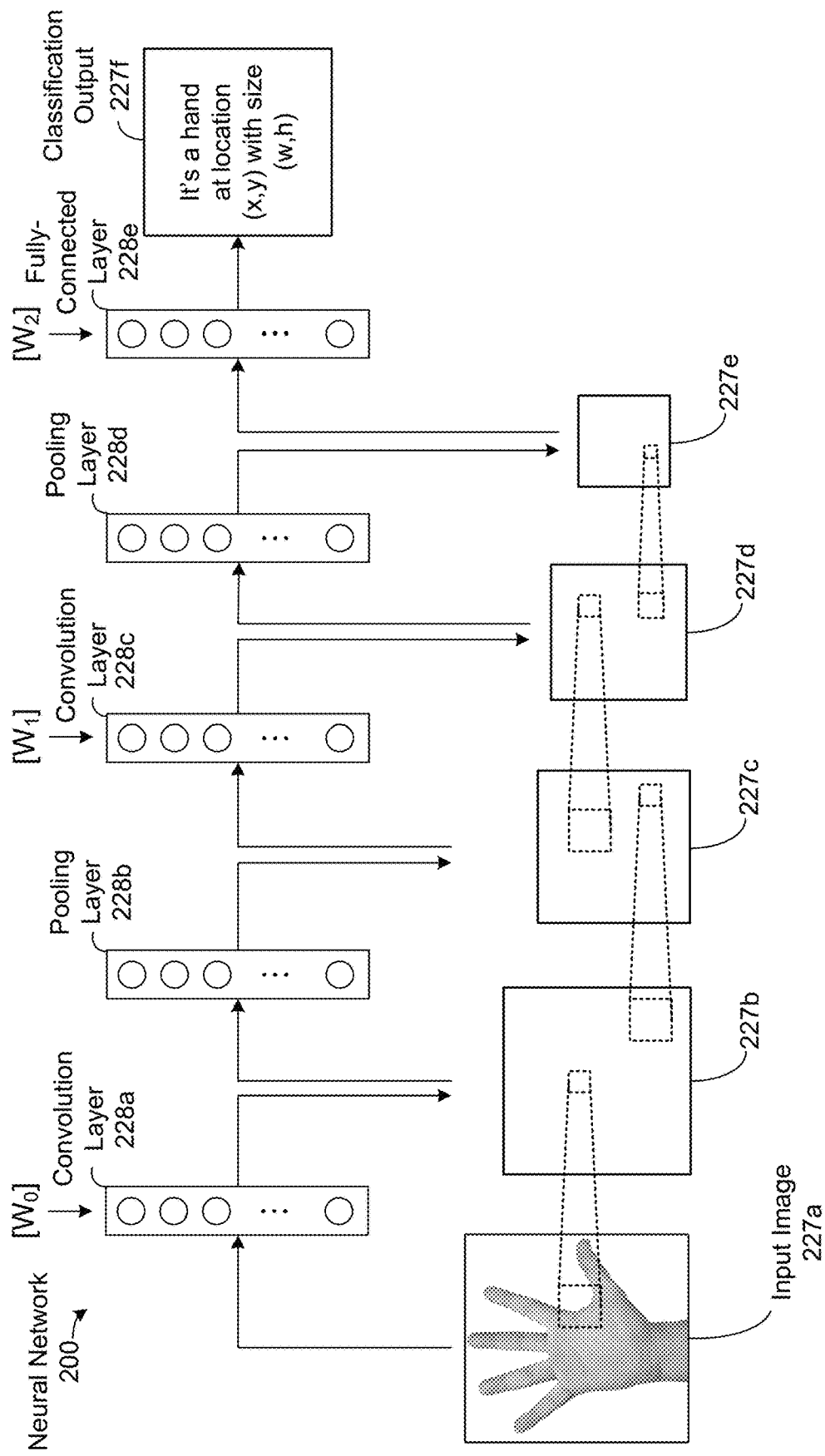
FIG. 2 illustrates an example architecture of a neural network that can be implemented using systolic arrays, in accordance with some embodiments.

FIG. 2 illustrates an example architecture of a neural network 200 that can be implemented using systolic arrays, in accordance with some embodiments. For example, neural network 200 may be executed by the NNP 110 in FIG. 1. The neural network 200 is a convolutional neural network (CNN) and can be configured to perform the following operations: (1) convolution; (2) non-linearity function (e.g., ReLU); (3) pooling or sub-sampling; and (4) classification (e.g. using a fully-connected layer). Different CNNs may have different combinations of these four types of operations.

The neural network 200 is configured to classify an input image 227a, which can be represented by a matrix of pixel values. The input image 227a may include multiple data channels, each channel representing a certain component of the image. For example, an image from a digital image sensor equipped with a color filter array (e.g., a Bayer filter) may have a red channel, a green channel, and a blue channel. Each channel may be represented by a 2-D matrix of pixels having pixel values within a predefined range, e.g., 0 to 255 for an 8-bit pixel value. A gray-scale image may have only one channel. In the following description, the processing of a single image channel using neural network 200 is described. Other channels may be processed similarly.

Input image 227a is processed by a first convolution layer 228a using a first weight array (labelled [$W_0$] in FIG. 2). First convolution layer 228a may include multiple nodes, with each node assigned to multiply a pixel of input image 227a with a weight from the first weight array. As part of the convolution operation, blocks of pixels of input image 227a can be multiplied with the first weight array to generate a sum. Each sum is then processed by a non-linear activation function (e.g., ReLU or Softmax) to generate an output, and the outputs can collectively form an output matrix 227b. The first weight array can be used to, for example, extract certain basic features (e.g., edges) from the input image 227a, and the output matrix 227b can represent a distribution of these basic features as a feature map. Output matrix (or feature map) 227b is passed to a first pooling layer 228b, where output matrix 327b is subsampled or down-sampled to generate a matrix 227c.

Matrix 227c is processed by a second convolution layer 228c using a second weight array (labelled [$W_1$] in FIG. 2). The second weight array can be used to, for example, identify patterns of features specific to a class of object, such as a hand, from matrix 227c. As part of the convolution operation, blocks of pixels of matrix 227c can be multiplied with the second weight array to generate a sum. Each sum is then processed by a non-linear activation function to generate an output, and the outputs can form an output matrix 227d. The output matrix 227d (or feature map) from the second convolution layer 228c may represent a distribution of features representing a hand or other object within the input image 227a. Output matrix 227d is passed to a second pooling layer 228d, where the output matrix 227d is subsampled or down-sampled to generate a matrix 227e.

Matrix 227e can then be passed through a fully-connected layer 228e, which can include a multi-layer perceptron (MLP). Fully-connected layer 228e can perform a classification operation based on the matrix 227e, e.g., to determine whether the object in the input image 227a is a hand or other class of object. Fully-connected layer 228e can also multiply matrix 227e with a third weight array (labelled [$W_2$] in FIG. 2) to generate sums, and the sums can also be processed by an activation function (e.g., ReLu or Softmax) to generate a classification output 227f.

Figure 3A:
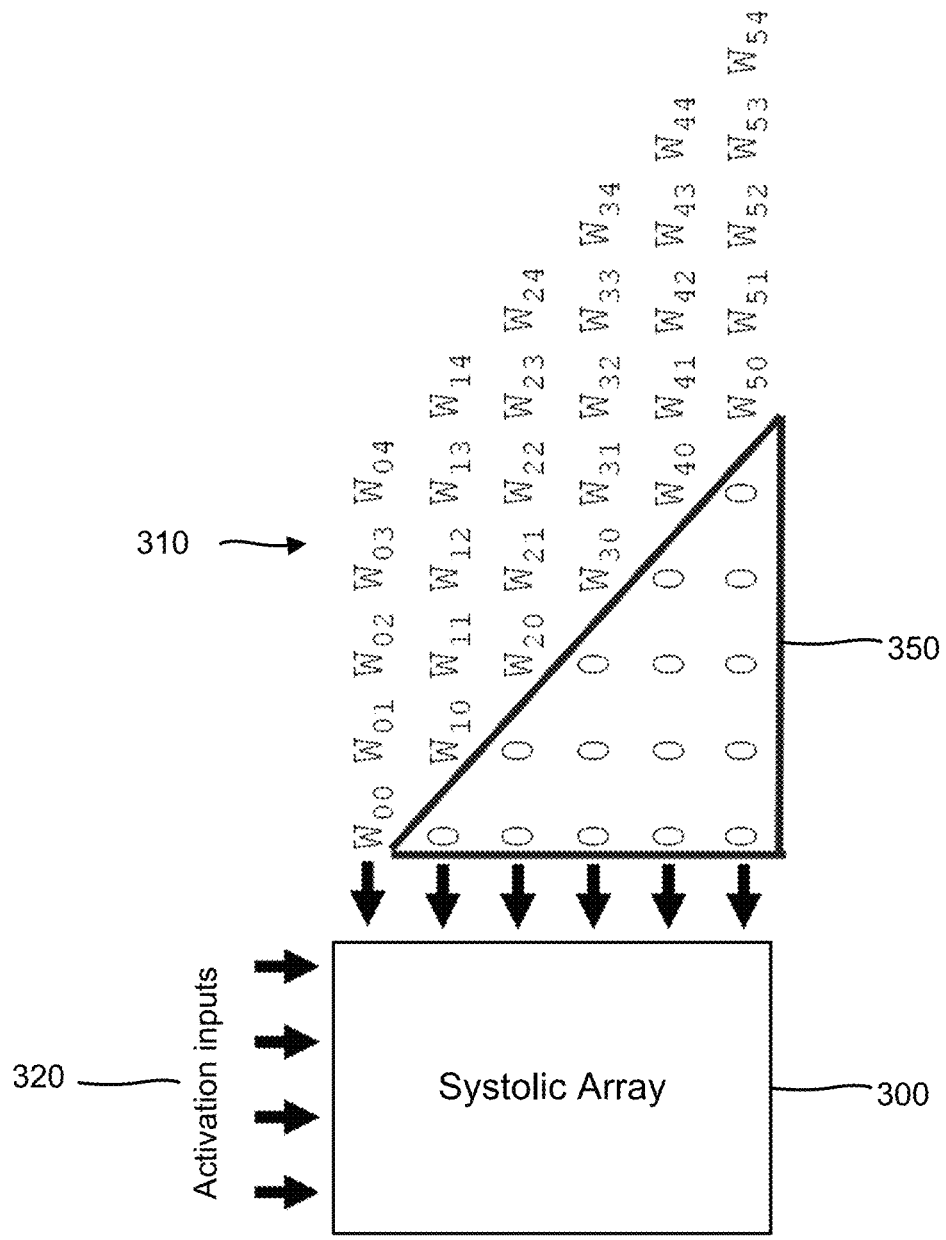
FIGS. 3A and 3B show examples of data being input to a systolic array, according to some embodiments.

FIG. 3A shows an example of data being input to a systolic array 300, according to some embodiments. In the example of FIG. 3A, the input data includes weights 310. The weights 310 are weights associated with a layer of a neural network implemented using the systolic array 300. For example, the weights 310 may include values for a weight array used by the convolution layer 228a to generate the output matrix 227b in FIG. 2. In addition to the weights 310, the systolic array 300 receives activation 320. The activations 320 may correspond to initial inputs of the neural network (e.g., data supplied to nodes of an input layer) or intermediate data (e.g., results generated by the nodes of a previous layer). Because neural networks often operate on large datasets, the inputs to the systolic array (e.g., the weights 310 and the activations 320) may form input streams in which new data arrives concurrently with processing of existing data by the systolic array.

As shown in FIG. 3A, the weights 310 are zero-padded to include a set of zero values 350. In this example, the weights form column vectors, each column vector has five weights, and each weight (e.g., $W_{00}$) is a digital value having one or more bits (e.g., 8-bit). A padded-zero can be expressed as a digital value with the same number of bits as a non-zero weight (e.g., eight bits of zeros). The column vectors are provided in a staggered format to construct the weight input for a computation, so that each successive column vector is shifted by one position. Accordingly, each successive column vector includes an additional zero beyond the number of zeroes padded to the previous column vector. The activations 320 may be structured in a similar manner to include padded zeros in positions corresponding to the padded zeros of the weights 310. In FIG. 3A, the weights 310 utilize the full width (every column) of the systolic array despite being zero-padded. However, there are situations where less than full-width utilization may occur, as shown in FIG. 3B.

Figure 3B:
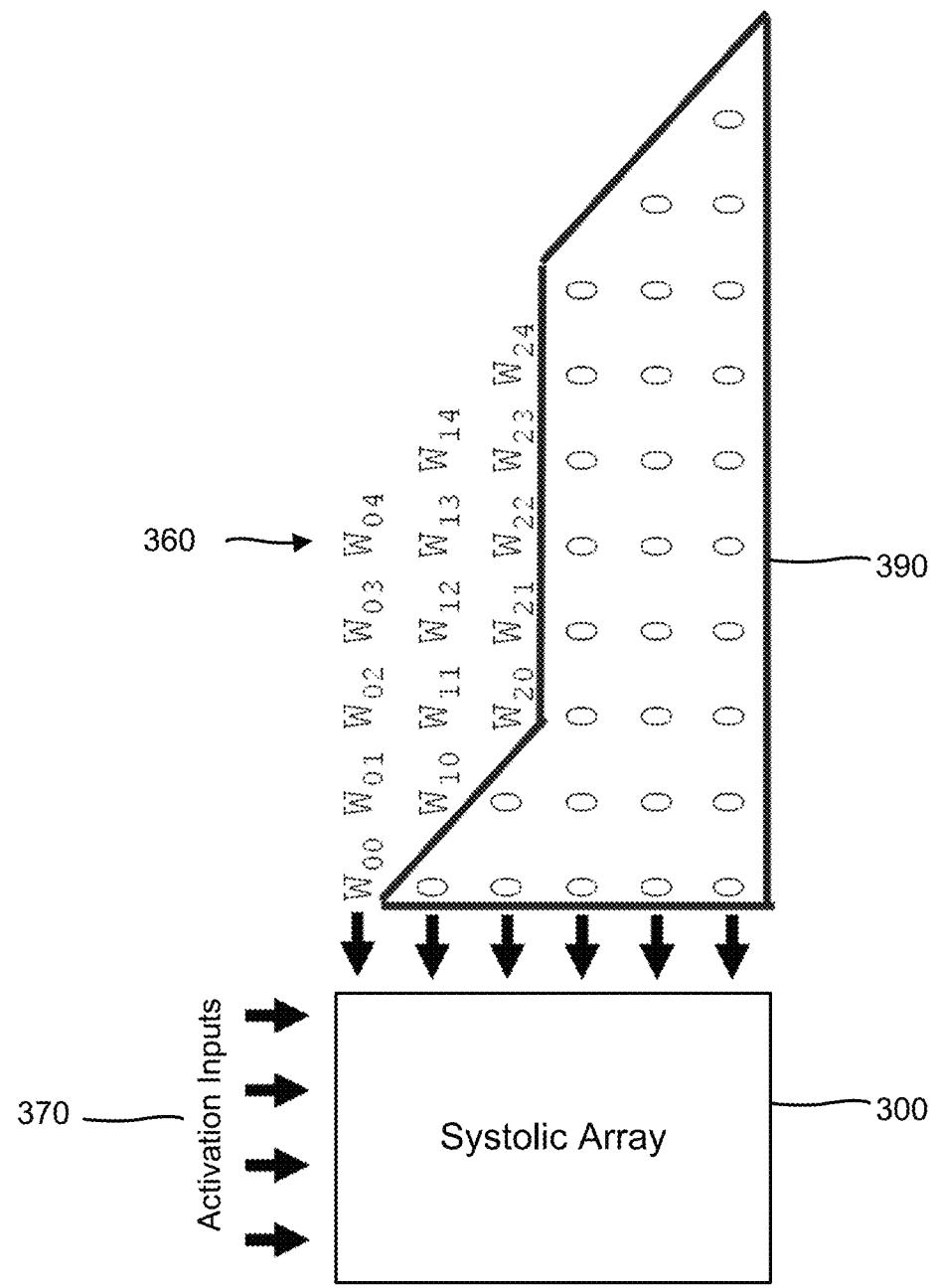

FIG. 3B shows another set of data being input to the systolic array 300. Like the example of FIG. 3A, the systolic array receives weights 360 and activations 370, with the zero-padding of the weights 360 being shown in the figure as a set of zeros 390. Unlike FIG. 3A, some of the columns in FIG. 3B are completely padded with zeros. Such columns correspond to empty vectors that contain no weight values for processing. The partial utilization scenario depicted in FIG. 3B tends to occur when the problem size for the computation being performed is relatively small, for example, when the number of output channels of a convolutional layer is small or the size/dimensions of a matrix (e.g., a convolution kernel) used to perform a matrix operation (e.g., matrix-matrix or vector-matrix multiplication) are small. Partial utilization also tends to occur more frequently in weights than activations because the weight matrices are typically smaller. As described above, zero-padding can result in wasted power. This may be true even in the partial utilization scenario of FIG. 3B. Although there may be little or no processing performed with respect to a row or column of all zeros, some hardware elements that are coupled to the row or column (e.g., sequential logic circuits configured to operate as storage registers) may still be active. Such hardware elements may, for example, continue to receive a clock signal that causes the hardware elements to consume power.

Figure 4:
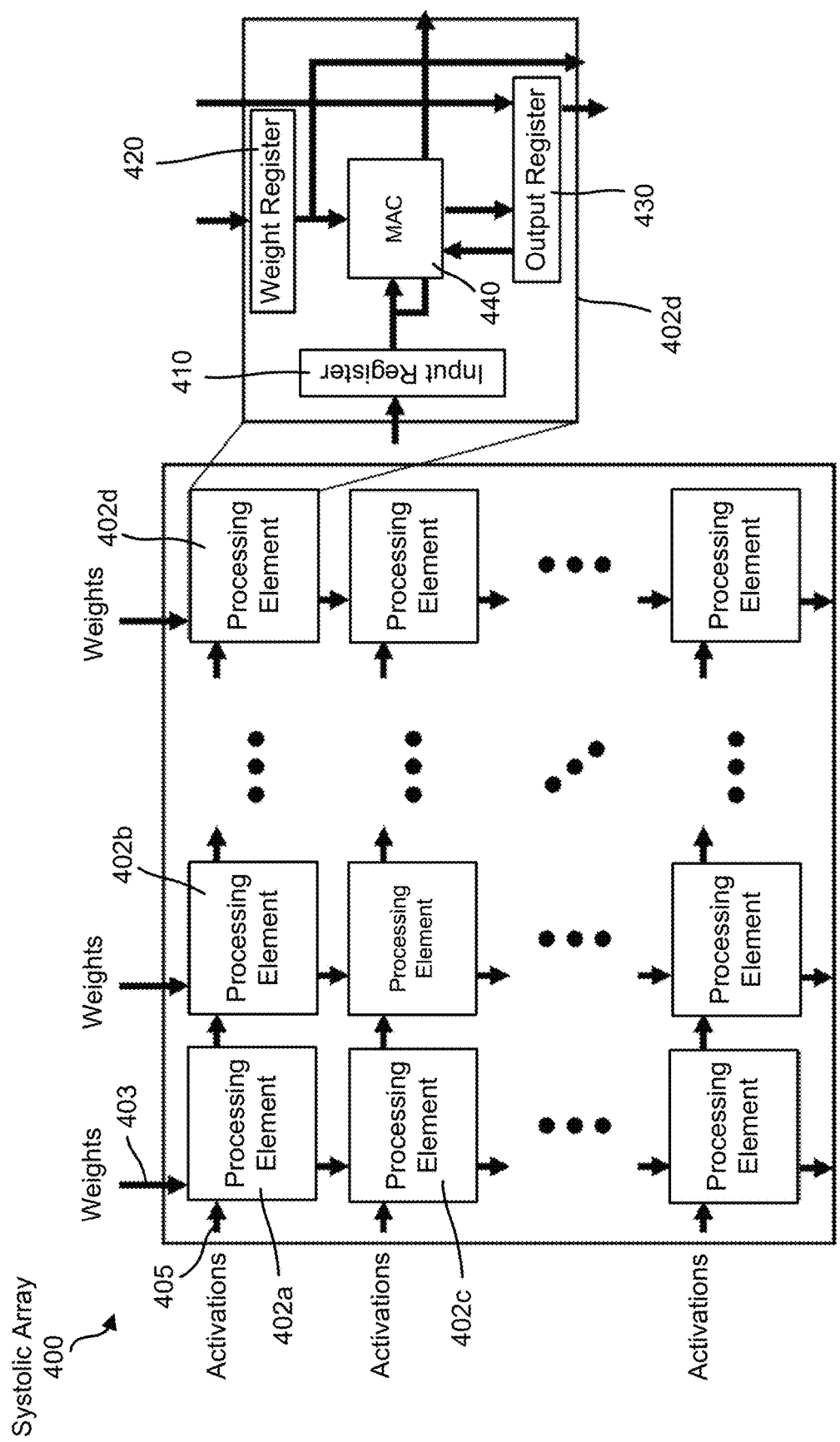
FIG. 4 shows an example systolic array.

FIG. 4 shows an example systolic array 400. The systolic array 400 includes processing elements (PEs) 402 arranged in two dimensions to form rows and columns of PEs, e.g., PEs 402a, 402b, 402c, and 402d. The structure of a PE depends on the type of computation to be performed by the PE. In general, every PE within a single systolic array is identically structured, but this need not always be the case. An example set of components for a PE within the systolic array 400 is shown in the inset image. As shown in FIG. 4, each PE 402 may include an input register 410, a weight register 420, and an output register 430. Each PE 402 may further include processing circuitry configured to perform a computation using values supplied by the input register 410, the weight register 420, and/or the output register 430. In the example of FIG. 4, the processing circuitry includes a multiply-accumulate (MAC) circuit 440 that performs the mathematical operation: $a=a+(b\times c)$, where a is an accumulated value stored in the output register 430, b is an input value from the input register 410, and c is a weight value from the weight register 420. The MAC circuit 440 may be used in connection with performing a matrix multiplication or convolution operation. The processing circuitry within a PE can be structured in other ways depending on the computation to be performed. For example, in some embodiments, the processing circuitry may be configured to perform a fused multiply-add (FMA). In general, the processing circuitry within a PE (e.g., MAC circuit 440) can be implemented using combinational logic, which does not require clocking. Thus, the MAC circuit 440 may be configured to produce an output value in response to supplied inputs and without being controlled by a clock signal. In contrast, memory elements such as input register 410, weight register 420, and output register 430 may be clocked in order to synchronize the timing with which data is provided to the MAC 440 or read out of the MAC 440.

The input register 410 stores an input value (e.g., an activation) to be processed by the MAC circuit 440. Similarly, the weight register 420 stores a weight value to be processed by the MAC circuit. In particular, the MAC circuit 440 updates an accumulated value in the output register 430 by adding to the accumulated value the result of multiplying an input value from the input register 410 with a corresponding weight value from the weight register 420. The MAC circuit 440 may receive updated input to compute a new result in each clock cycle. In some instances, the updated input is supplied by an adjacent PE 402, e.g., from the input register 410, the weight register 420, or the output register 430 of a PE in the previous column or row. Depending on the configuration of the systolic array, an activation, a weight, and/or a result stored in an output register may be shifted into the PE from an adjacent PE for processing in the next clock cycle. Likewise, the PE may shift its activation, weight, and/or result into an adjacent PE for processing in the next clock cycle, for example, a PE in the next column or row.

Data flow within a systolic array can be characterized according to what data remains stationary as opposed to being shifted out into an adjacent PE for processing in the next clock cycle. One method of processing data using systolic array 400 is the "output stationary" method, in which a first PE receives inputs (e.g., activation and weight values) in one clock cycle, performs an operation using the received inputs (e.g., a partial computation contributing to the results of the overall computation), and stores the result of the operation in an output register. In the next clock cycle, the result stored in the output register of the first PE remains stored there, possibly to be updated based on processing performed by the first PE during the next clock cycle. For example, the accumulated value stored in the output register 430 may be repeatedly updated based on activation and weight values received over multiple clock cycles. However, the inputs used by the first PE during the first clock cycle (e.g., the previous weight and previous activation) are now shifted to a different PE for processing. For example, a weight may be shifted from PE 402a into PE 402c in the next row below, and an activation may be shifted from PE 402a to PE 402b in the next column on the right. A single computation may therefore involve a stream 403 of weights that is sequentially shifted through each PE within a column and a stream 405 of activations that is sequentially shifted through each PE within a row. Each stream 403 of weights may correspond to a different vector in a weight array. Similarly, each stream 405 of activations may correspond to a different vector in an activation array. At the end of a computation (e.g., once all the weights and activations provided for the computation have been processed) the results stored in the output registers 430 of each PE are read out of the systolic array.

In a "weight stationary" data flow, the entire set of weights for a computation are preloaded into each PE and are not shifted out. For example, each weight register 420 may be preloaded with a single weight value that is retained for the duration of a computation to be performed by the systolic array 400. However, non-weight inputs (e.g., activations) are streamed into the rows to be shifted together with the outputs of the local processing in each clock cycle. For example, an activation may be shifted from PE 402a into PE 402b in the next column, while an output value may be shifted from PE 402a into PE 402c in the next row. In the case of a multiply-accumulate operation, the activation values may flow across columns to become multiplied with stationary weights, and the resulting multiplication products may flow across rows as partial sums that are combined at the final row of PEs, e.g., to produce a single row of output values in each clock cycle, with multiple rows of output values ultimately being combined to form a 2-D matrix of output values.

Similarly, in an "input stationary" data flow, an entire set of non-weight inputs (e.g., activations) for a computation are preloaded into each PE and are not shifted out. For example, each input register 410 may be preloaded with a single activation value that is retained for the duration of a computation to be performed by the systolic array 400. However, weights are streamed into the columns to be shifted together with the outputs of the local processing in each clock cycle. For example, a weight may be shifted from PE 402a into PE 402c in the next row, while an output value may be shifted from PE 402a into PE 402b in the next column.

As indicated above, aspects of the present disclosure relate to column-wise clock gating, a column being functionally interchangeable with a row. When the inputs to the columns are weights such as in the example of FIG. 4, column-wise clock gating may be performed in connection with output stationary or input stationary data flow. Further, in some embodiments, column-wise clock gating may be combined with local clock gating within each PE (e.g., every PE 402). In local clock gating, each PE may include a local clock gate controller that checks whether an input to the PE (e.g., weight or activation) is zero. If so, the local clock gate controller can disable a local clock of the PE (e.g., a clock input of the PE's output register). However, such local disabling is only specific to that particular PE and does not affect the clock inputs to other PEs. For example, local disabling of a clock to a first PE in a column (e.g., PE 402*a*) would not prevent clock signals from being input to other PEs in the same column (e.g., PE 402*c*) or, more generally, other PEs in the same clock signal path. Additionally, row-wise clock gating can be performed in some embodiments, for example, with respect to activation inputs. However, clock gating with respect to weights is expected to result in more power savings since weight matrices tend to be much smaller, at least in the context of convolutional neural networks.

FIG. 5 shows a systolic array 500 configured to support clock tree gating (e.g., column-wise clock gating), according to some embodiments. The systolic array 500 is structured similarly to the systolic array 400 in FIG. 4 and includes rows and columns of PEs 502. A PE 502 can include, among other things, an input register, a weight register, an output register, and processing circuitry. Accordingly, the above discussion of PEs in FIG. 4 also generally applies to the PEs in FIG. 5. Additionally, the systolic array 500 includes a separate clock gate controller 510 for each column. In some embodiments, clock gate controllers may be provided for rows in addition or as an alternative to being provided for columns. As discussed below, a clock gate controller can be implemented using control logic that determines the state of a clock signal output by the clock gate controller, based on whether an input stream includes a zero value, e.g., the stream 403 in FIG. 4.

Each PE 502 in FIG. 5 operates according to a respective clock signal that is local to the PE. The local clock signals can be derived from a clock root 501. The clock root 501 can be generated by a clock generator circuit of a device incorporating the systolic array 500, e.g., a clock generator within the NNP 110. In some embodiments, the clock root 501 may correspond to a common or master clock for a chip on which the systolic array is included (e.g., a neural network accelerator implemented as a system-on-chip). The clock root 501 is distributed to the PEs through a clock tree 505. In the example of FIG. 5, each main branch of the clock tree 505 corresponds to an individual column. As shown in FIG. 5, the clock tree 505 branches to eventually form a local clock signal 512 for each PE in the systolic array 500. Each clock gate controller 510 generates a gated clock signal 503 (e.g., 503*a*, 503*b* . . . 503*n*) for one of the n columns of the systolic array. Each gated clock signal 503 may be identical in frequency to the clock root 501 and is in turn distributed to every PE in a corresponding column, in the form of a local clock signal 512.

FIG. 5 is a simplified representation of the propagation paths of the clock signals, which are typically driven from one side of the systolic array (here, the column side). In actuality, a clock tree may branch in three dimensions and be configured to deliver a local clock signal to each PE at approximately the same time. For example, the clock tree 505 may be arranged with a master clock generator in the middle of the systolic array 500 and then branch into four clock signals, one for each quadrant of the systolic array, before branching into further clock signals. Therefore, it is not necessarily the case that every local clock signal 512 in a column is derived from the same gated clock signal 503. In general, a gated clock signal can be a clock source for any plurality of PEs in a systolic array. Various types of clock trees exist, some of which are not perfectly symmetric or uniform in the way in which the tree branches.

Further, a clock tree may include or travel across additional hardware elements that consume power as a result of being connected to the clock tree. For example, each PE 402 may include or be coupled to one or more clock buffers that correct for clock skew. As clock signals propagate throughout the systolic array, they may arrive with slightly different timing than designed due to variations in wiring or capacitance of the circuit elements. Accordingly, a clock buffer may be provided for each PE 502 to correct for skew in the local clock signal 512 of the PE, so that the local clock signal toggles (switches high or low) simultaneously or synchronously with the local clock signals of other PEs.

The clock gate controllers 510 can turn off (drive low or disable) the gated clock signal 503 for each column independently. In the absence of column-wise clock gating, the clock signals at the column level would continue to toggle between high and low states even when an input to a column is zero. Each clock gate controller 510 can be implemented using an integrated clock gating (ICG) cell. The clock gate controller can be implemented using one of two types of ICG cells, although other ICG cells may also implement a clock gate controller 510. The first type of ICG cell uses an AND gate having the output (Q) of a latch as one input and an input clock signal (e.g., the clock root 501) as a second input. The input clock signal is coupled to an enable input (E) of the latch. The latch is negative edge triggered using an enable signal that is coupled to the data input (D) of the latch. The output of the AND gate forms an output clock signal (e.g., a gated clock signal 503). For example, when the enable input E (the input clock signal) is low, the output clock signal may also be low. The second type of ICG cell uses an OR gate instead of an AND gate and features a latch that is positive edge triggered.

Additionally, each clock gate controller 510 may be configured to implement a state machine using, for example, combinational logic. Since combinational logic does not require a clock, the state machine of the clock gate controller 510 can remain active even when the input clock signal to the clock gate controller has been turned off. This permits the clock gate controller 510 to switch its output clock signal (e.g., a gated clock signal 503) back on in response to detecting a non-zero input regardless of the state of the input clock signal to the clock gate controller. The output clock signal can be selectively enabled or disabled (e.g., through controlling the enable input E) according to the current state of the state machine. Clock gate controller 510 may also include additional circuitry that times the disabling of the output clock signal by waiting for the output clock signal to fall low before turning the output clock signal off, thereby avoiding potential glitches due to shortened clock pulses.

It is possible to disable the clock to some PEs when an input value (e.g., a weight) is zero without impacting the overall results of the computation even though shifting of data is supposed to occur, e.g., shifting of weights and activations in an output stationary configuration. This is because the result is usually also zero when an input value is zero. For example, based on the format of the weights in FIG. 3A and assuming a multiply-accumulate operation, any time a zero is passed into a column, the output values of the PEs for the entire column will remain zero until a non-zero value gets passed into the column. Further, as shown in FIG. 3A, the weights are zero-padded such that the weight values for the rest of the row (from the current column to the final, rightmost column) are also zero, so there is no need to shift the activations of that row given that the multiplication product would be zero regardless of the values of the activations that are supposed to be multiplied with the zero-valued weights. Additionally, the storage registers of a PE (e.g., input register 410, weight register 420, and/or output register 430) can be initialized to zero so that there is no need to shift zero values into the PE or out of the PE.

Figure 6:
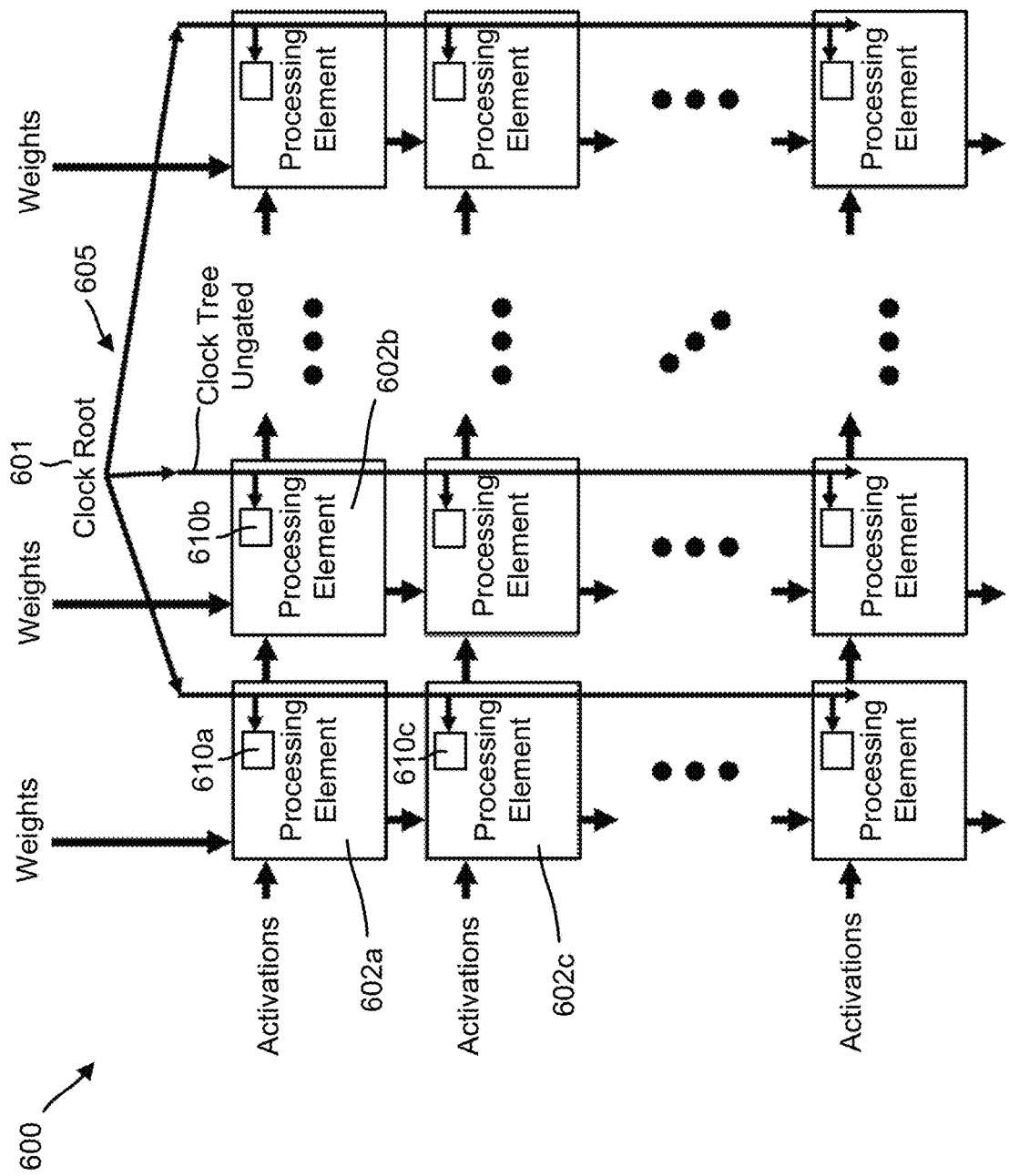
FIG. 6 shows an example of a systolic array without clock tree gating.

FIG. 6 shows an example of a systolic array 600 without clock tree gating. The systolic array 600 includes rows and columns of PEs 602. Each PE 602 operates according to a local clock signal derived from a clock root 601. In the absence of clock tree gating, the systolic array 600 may implement local clock gating. For example, each PE 602 can include a clock gate controller 610 that is specific to the PE. Like the clock gate controller 510 in FIG. 5, the clock gate controller 610 can be implemented using an ICG cell. However, the clock gate controller 610 only controls the on/off state of the local clock signal for a respective PE. Accordingly, each clock gate controller 610 is associated with a terminal branch or endpoint of a clock tree 605. In contrast, the clock gate controller 510 in FIG. 5 controls the on/off state of a gated clock signal 503 from which multiple downstream clock signals (local clock signals 512) are derived. Such downstream control is not possible through local clock gating. For example, if a clock gate controller 610a of a first PE 602a turns off the local clock signal for PE 602a in response to detecting that a zero value has been loaded into a weight register of the PE 602a, this does not prevent a clock gate controller 610c of a second PE 602c in the same column from keeping the local clock signal for the PE 602c running.

In order to increase power savings, the clocking gating technique described above in reference to FIG. 5 can be applied alone or in combination with local clock gating as described in reference to FIG. 6. For example, in some embodiments, column-wise clock gating may be combined with local clock gating, where the local clock gating is performed with respect to row inputs (e.g., activations). Some power savings may result from checking for zero at the column level rather than locally in each PE. Moreover, disabling the clock to an entire column results in substantial power savings since there are components in the clock branch (e.g., buffers or registers) that would otherwise consume power. For example, power savings may arise from not transferring a gated clock signal 503 downstream to elements that do not require the gated clock signal 503 due to the data processed or stored by those elements being zero.

Column-wise clock gating can be adapted to the structure of the clock tree for a given systolic array and can be generalized to clock gating at any level other than the local (individual PE) level. For example, if the local clock signals for a column of PEs are collectively derived from two branches of a clock tree, the column can be provided with two clock gate controllers instead of a single clock gate controller 510, and each of these two clock gate controllers may be coupled to the column input to concurrently detect the presence of a zero value at the column input and, in response, turn off all the local clock signals in the column.

Figure 7:
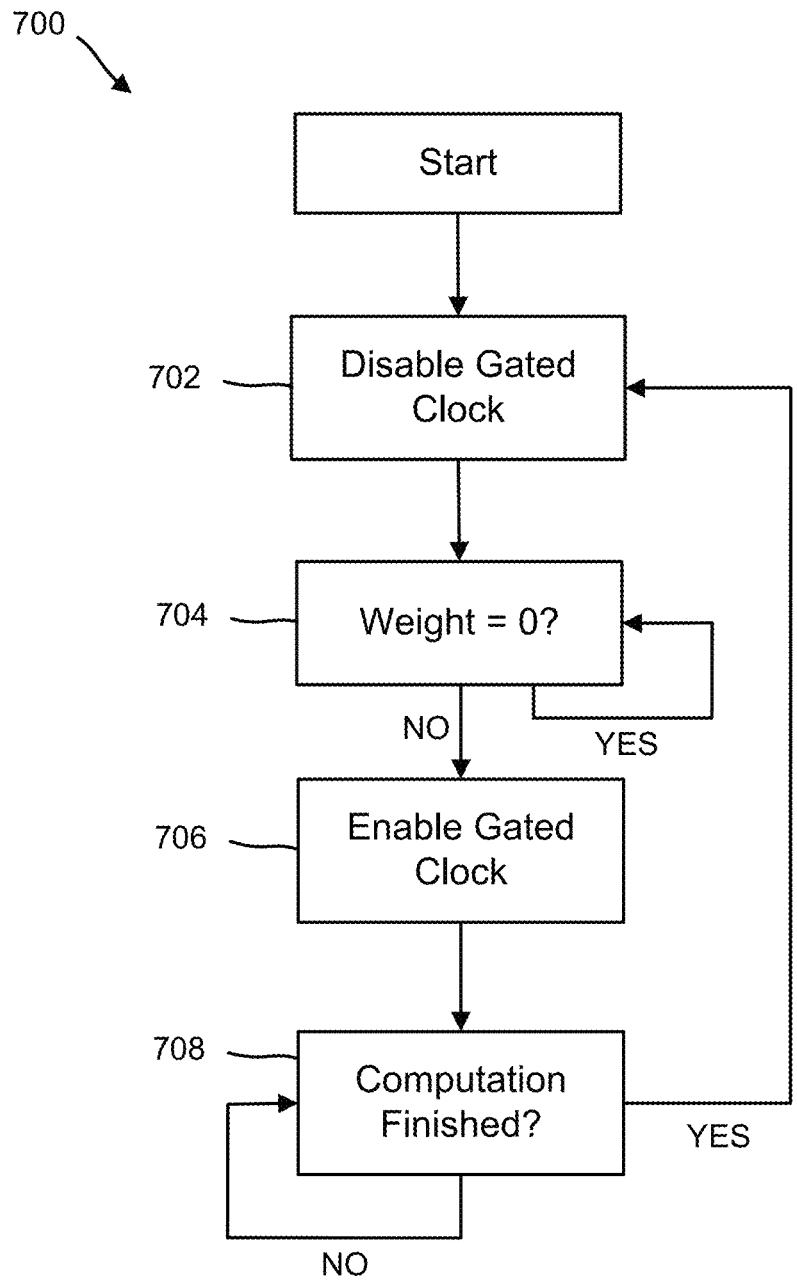
FIG. 7 shows an example process that can be performed by a clock gate controller, according to some embodiments.

FIG. 7 shows an example process 700 that can be performed by a clock gate controller (e.g., clock gate controller 510), according to some embodiments. The process 700 may be performed using combinational control logic and associated storage elements that together implement a state machine. Block 702 corresponds to the start of a computation to be performed by a systolic array. At 702, the clock gate controller disables the gated clock signal for its corresponding clock tree branch (e.g., an entire column of the systolic array). The gated clock signal is an output of the clock gate controller and is a clock signal from which downstream clock signals, including local clock signals for a set of PEs, are derived. Disabling the gated clock signal may involve switching the gated clock signal from an ON state in which the gated clock signal toggles between high and low with each successive clock pulse, to an OFF state in which the gated clock signal remains low.

At 704, the clock gate controller checks whether the most recent weight value that was received through an input stream to which the clock gate controller is coupled (e.g., the input stream of a single column) is zero. If so, the process 700 loops back to 704 and the gated clock signal remains disabled. Otherwise, the process 700 proceeds to block 706 after the clock gate controller detects the first non-zero weight value in its input stream.

At 706, the clock gate controller enables the gated clock signal, thereby causing the gated clock signal to commence or resume toggling between high and low. Consequently, the local clock signals derived using the gated clock signal (e.g., local clock signals 512) will also toggle between high and low, triggering storage registers and/or other clocked components within the set of PEs. In this manner, each PE within the set of PEs can perform an operation contributing to the overall results of the computation and data can flow across different PEs, e.g., shifting of an activation or weight value from one PE into an adjacent PE (in the same or a different column) during the next clock cycle.

At 708, the clock gate controller determines whether the computation has finished, e.g., when all the weights and activations supplied for the computation have been processed. In some implementations, the clock gate controller detects the end of the computation through counting the number of input values that have been received so far and comparing the count to an expected total (e.g., the total number of rows in a weight array). Alternatively, the end of the computation can be signaled to the clock gate controller by another component, such as the controller 115 in FIG. 1. If the computation has not yet finished, the process 700 loops back to 708, where the gated clock signal remains enabled to permit the remaining values of the input stream to be processed. However, if the computation is finished, the process 700 returns to block 702, where the gated clock signal is again disabled in preparation for the next computation. Additionally, the results of the computation can now be read out of the systolic array, e.g., to host 102 or to a different systolic array for further processing. In an output stationary configuration, the complete set of results for a matrix multiplication or convolution may be read out of the output registers of the PEs in the systolic array. The reading of the computation results can be performed before returning to block 702.

Figure 8:
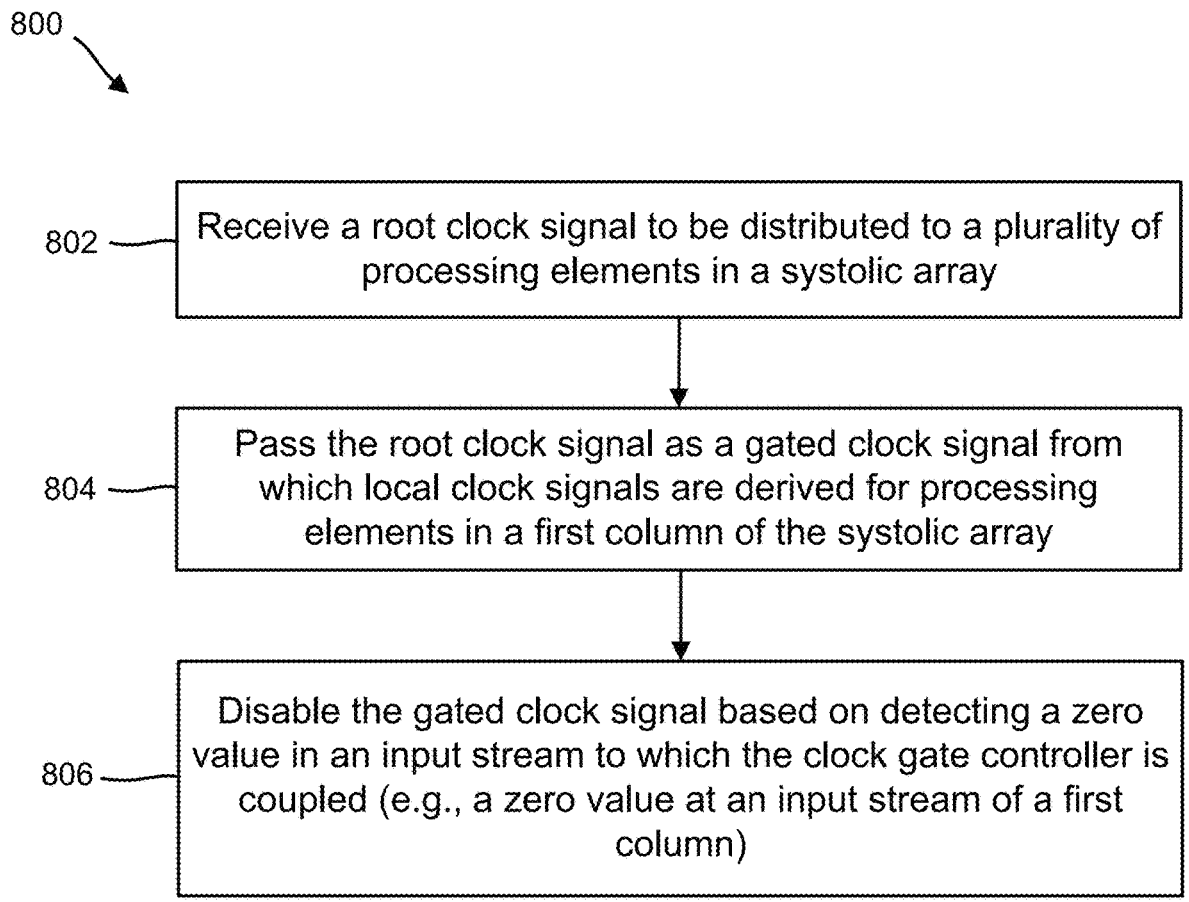
FIG. 8 shows an example process that can be performed by a clock gate controller, according to some embodiments.

FIG. 8 shows an example process 800 that can be performed by a clock gate controller (e.g., clock gate controller 510), according to some embodiments. The functionality described with respect to the process 800 can be implemented in various ways, including in accordance with the operations described in reference to the process 700 of FIG. 7.

At 802, the clock gate controller receives a root clock signal to be distributed to a plurality of PEs in a systolic array. The systolic array includes PEs arranged in at least two dimensions, e.g., a 2-D array with rows and columns. At least the dimension corresponding to the columns of the systolic array is a dimension along which input data is streamed into the systolic array. In particular, each column may receive a separate stream of data such as a stream of weight values, as depicted in FIG. 3A. Depending on the configuration of the systolic array, other dimensions (e.g., the row dimension) may also receive input streams. The plurality of PEs can include PEs that form a single column within the systolic array and, in some implementations, includes every PE within one column. The clock gate controller is part of a clock distribution network through which a root clock signal is distributed to the plurality of PEs. In some instances, the clock distribution network may form a tree such as the clock tree 505 in FIG. 5.

At 804, the clock gate controller passes the root clock signal as a gated clock signal from which local clock signals are derived for the plurality of PEs. As indicated above, the local clock signals may be generated using additional components that are located downstream of the clock gate controller and which influence clock timing. An example of such additional components is local buffers that correct for clock skew such that the local clock signals of every PE in the systolic array have substantially identical timing. The gated clock signal can be generated using an ICG cell implemented in combinational logic, e.g., an AND gate or an OR gate, as discussed above.

The gated clock signal mirrors the root clock signal so long as the gated clock signal remains enabled. The clock gate controller can enable the gated clock signal at various times during the operation of the systolic array. For instance, if implemented according to the process in FIG. 7, the functionality in block 804 may be performed after disabling the gated clock signal and then waiting until a non-zero weight value is received at the input to a column. The timing of the enabling or disabling of the gated clock signal may also depend on how the input data is structured. For example, if the input stream is padded with trailing zeros instead of leading zeros, the functionality in block 804 may be performed at the start of a computation, e.g., before the first weight value is received at the input to the column.

At 806, the clock gate controller disables the gated clock signal based on detecting a zero value in an input stream to which the clock gate controller is coupled. For example, as shown in FIG. 5, a clock gate controller 510 can be coupled to the input stream of a first column so that the gated clock signal produced by the clock gate controller is disabled until a non-zero value is received at the input stream of the first column. If implemented according to the process in FIG. 7, the functionality in block 806 may involve disabling the gated clock signal before any values are received at the input stream of the first column, and then keeping the gated clock signal disabled until the first non-zero value (e.g., an initial value in a sequence of non-zero values) is observed at the input stream of the first column. However, as discussed above in connection with block 804, the timing of the enabling or disabling of the gated clock signal may depend on how the input data is structured. In general, a clock gate controller can be configured to disable its gated clock signal any time a zero value is detected in an input stream. Accordingly, in some implementations, the disabling of the gated clock signal in block 806 may be performed in response to the clock gate controller detecting the first instance of a zero value in the input stream. Similarly, the enabling of the gated clock signal which permits the gated clock signal to be passed in block 804 can be performed in response to the clock gate controller detecting a non-zero value.

Column-wise clock gating can save a significant amount of power compared to not performing any clock gating or even local clock gating. In a computer simulation, the power consumption of a first systolic array configured with both local clock gating and column-wise clock gating was compared to that of a second systolic array configured only with local clock gating. During the simulation, different layers of an example neural network were executed on both systolic arrays. In general, layers that utilized smaller input matrices (e.g., smaller weight arrays) benefited more from column-wise clock gating compared to layers that utilized larger input matrices, since there are more padded zeros in a smaller input matrix. For any given layer of the neural network, the combination of column-wise clock gating and local clock gating resulted in less power consumption compared to local clock gating alone. The results of the simulation indicated that the first systolic array consumed up to 36% less power than the second systolic array.

The disclosed techniques may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content (e.g., virtual objects) or generated content combined with captured content (e.g., real-world objects). For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using a light-emitting diode (LED) based display subsystem. The artificial reality system that provides the artificial reality content may be implemented on various platforms, including a head-mounted display (HMD) or heads-up display (HUD) connected to a host computer system, a standalone HMD, a mobile device or computing system, or any other hardware platform capable of providing artificial reality content to one or more viewers. Accordingly, in some embodiments, an artificial reality system may include one or more systolic arrays (e.g., NNP 110 of FIG. 1) that are configured to perform processing relating to analysis of captured content and/or generation of content.

Figure 9:
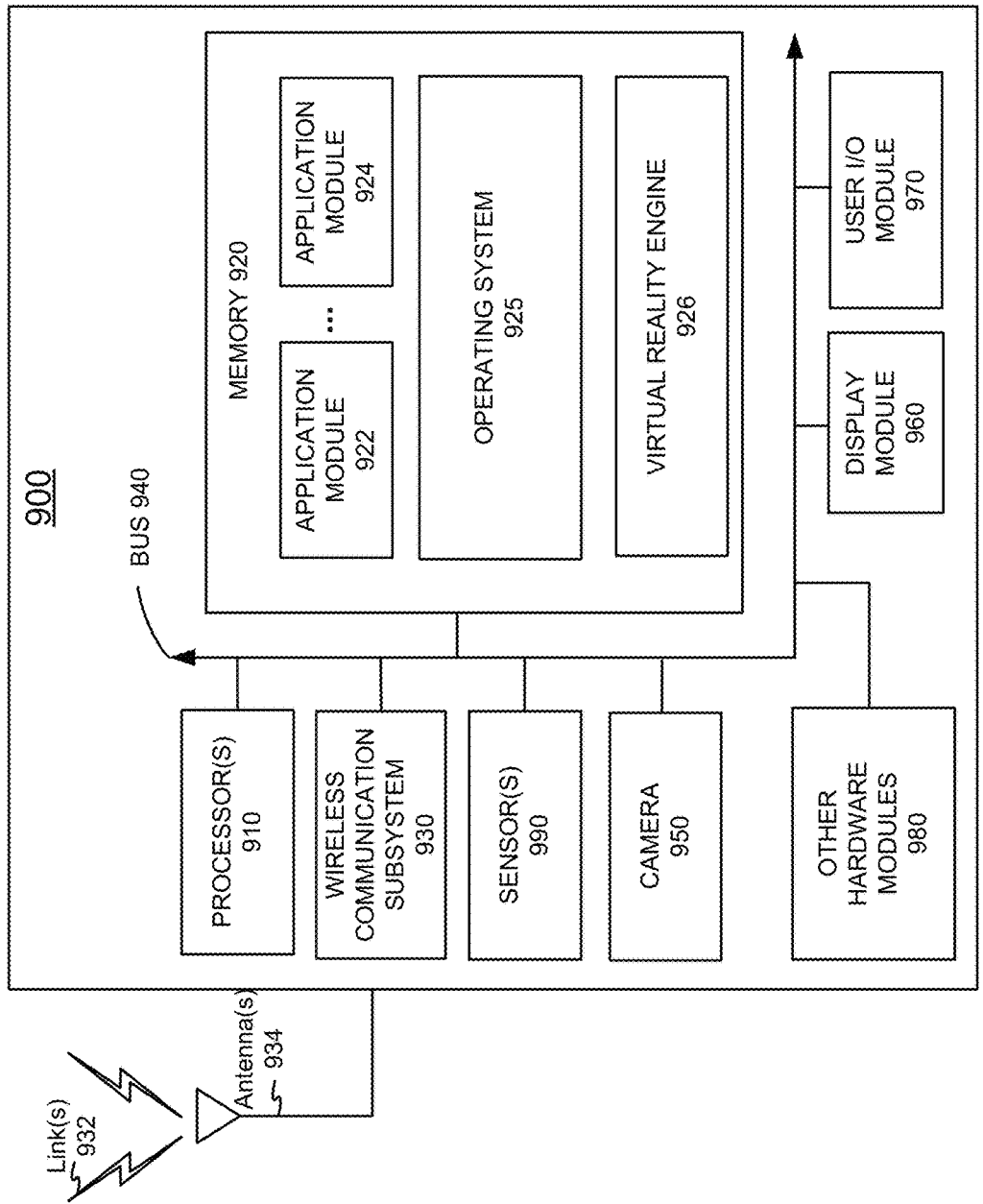
FIG. 9 is a simplified block diagram of an example electronic system for implementing one or more embodiments disclosed herein.

FIG. 9 is a simplified block diagram of an example electronic system 900 for implementing one or more embodiments disclosed herein. In some embodiments, the electronic system 900 is integrated into an HMD or near-eye display system. Electronic system 900 may include one or more processor(s) 910 and a memory 920. Processor(s) 910 may be configured to execute instructions for performing operations at a number of components, and can be, for example, a general-purpose processor or microprocessor suitable for implementation within a portable electronic device. Alternatively or additionally, the processor(s) 910 may include one or more special-purpose processors, such as an NNP configured to execute a neural network. Accordingly, the electronic system 900 can implement the host 102 and/or the NNP 110 of FIG. 1.

Processor(s) 910 may be communicatively coupled with a plurality of components within electronic system 900. To realize this communicative coupling, processor(s) 910 may communicate with the other illustrated components across a bus 940. The bus 940 may be any subsystem adapted to transfer data within electronic system 900. Bus 940 may include a plurality of computer buses and additional circuitry to transfer data.

Memory 920 may be coupled to processor(s) 910. In some embodiments, memory 920 may offer both short-term and long-term storage and may be divided into several units. Memory 920 may be volatile, such as static random access memory (SRAM) and/or dynamic random access memory (DRAM) and/or non-volatile, such as read-only memory (ROM), flash memory, and the like. Furthermore, memory 920 may include removable storage devices, such as secure digital (SD) cards. Memory 920 may provide storage of computer-readable instructions, data structures, program modules, and other data for electronic system 900. In some embodiments, memory 920 may be distributed into different hardware modules. A set of instructions and/or code might be stored on memory 920. The instructions might take the form of executable code that may be executable by electronic system 900, and/or might take the form of source and/or installable code, which, upon compilation and/or installation on electronic system 900 (e.g., using any of a variety of generally available compilers, installation programs, compression/decompression utilities, etc.), may take the form of executable code.

In some embodiments, memory 920 may store a plurality of application modules 922 through 924, which may include any number of applications. Examples of applications may include gaming applications, conferencing applications, video playback applications, or other suitable applications. The applications may include a depth sensing function or eye tracking function. Application modules 922-924 may include particular instructions to be executed by processor(s) 910. In some embodiments, certain applications or parts of application modules 922-924 may be executable by other hardware modules 980. In certain embodiments, memory 920 may additionally include secure memory, which may include additional security controls to prevent copying or other unauthorized access to secure information.

In some embodiments, memory 920 may include an operating system 925 loaded therein. Operating system 925 may be operable to initiate the execution of the instructions provided by application modules 922-924 and/or manage other hardware modules 980 as well as interfaces with a wireless communication subsystem 930 which may include one or more wireless transceivers. Operating system 925 may be adapted to perform other operations across the components of electronic system 900 including threading, resource management, data storage control and other similar functionality.

Wireless communication subsystem 930 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 900 may include one or more antennas 934 for wireless communication as part of wireless communication subsystem 930 or as a separate component coupled to any portion of the system. Depending on desired functionality, wireless communication subsystem 930 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 930 may permit data to be exchanged with a network, other computer systems, and/or any other devices described herein. Wireless communication subsystem 930 may include a means for transmitting or receiving data, such as identifiers of HMD devices, position data, a geographic map, a heat map, photos, or videos, using antenna(s) 934 and wireless link(s) 932. Wireless communication subsystem 930, processor(s) 910, and memory 920 may together comprise at least a part of one or more of a means for performing some functions disclosed herein.

Embodiments of electronic system 900 may also include one or more sensors 990. Sensor(s) 990 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 990 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or any combination thereof. The position sensors may be located external to the IMU, internal to the IMU, or any combination thereof. At least some sensors may use a structured light pattern for sensing.

Electronic system 900 may include a display module 960. Display module 960 may be a near-eye display, and may graphically present information, such as images, videos, and various instructions, from electronic system 900 to a user. Such information may be derived from one or more application modules 922-924, virtual reality engine 926, one or more other hardware modules 980, a combination thereof, or any other suitable means for resolving graphical content for the user (e.g., by operating system 925). Display module 960 may use liquid crystal display (LCD) technology, LED technology (OLED, ILED, micro-LED, AMOLED, TOLED, etc.), light emitting polymer display (LPD) technology, or some other display technology.

Electronic system 900 may include a user input/output module 970. User input/output module 970 may allow a user to send action requests to electronic system 900. An action request may be a request to perform a particular action. For example, an action request may be to start or end an application or to perform a particular action within the application. User input/output module 970 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 900. In some embodiments, user input/output module 970 may provide haptic feedback to the user in accordance with instructions received from electronic system 900. For example, the haptic feedback may be provided when an action request is received or has been performed.

Electronic system 900 may include a camera 950 that may be used to take photos or videos of a user, for example, for tracking the user's eye position. Camera 950 may also be used to take photos or videos of the environment, for example, for VR, AR, or MR applications. Camera 950 may include, for example, a complementary metal-oxide-semiconductor (CMOS) image sensor with a few million or tens of millions of pixels. In some implementations, camera 950 may include two or more cameras that may be used to capture 3-D images.

In some embodiments, electronic system 900 may include a plurality of other hardware modules 980. Each of the other hardware modules 980 may be a physical module within electronic system 900. While each of the other hardware modules 980 may be permanently configured as a structure, some of the other hardware modules 980 may be temporarily configured to perform specific functions or temporarily activated. Examples of other hardware modules 980 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 980 may be implemented in software.

In some embodiments, memory 920 of electronic system 900 may also store a virtual reality engine 926. Virtual reality engine 926 may execute applications within electronic system 900 and receive position information, acceleration information, velocity information, predicted future positions, or any combination thereof of the HMD device from the various sensors. In some embodiments, the information received by virtual reality engine 926 may be used for producing a signal (e.g., display instructions) to display module 960. For example, if the received information indicates that the user has looked to the left, virtual reality engine 926 may generate content for the HMD device that mirrors the user's movement in a virtual environment. Additionally, virtual reality engine 926 may perform an action within an application in response to an action request received from user input/output module 970 and provide feedback to the user. The provided feedback may be visual, audible, or haptic feedback. In some implementations, processor(s) 910 may include one or more graphics processing units (GPUs) that execute virtual reality engine 926.

In various implementations, the above-described hardware and modules may be implemented on a single device or on multiple devices that can communicate with one another using wired or wireless connections. For example, in some implementations, some components or modules, such as GPUs, virtual reality engine 926, and applications (e.g., tracking application), may be implemented on a console separate from the HMD device. In some implementations, one console may be connected to or support more than one HMD.

In alternative configurations, different and/or additional components may be included in electronic system 900. Similarly, functionality of one or more of the components can be distributed among the components in a manner different from the manner described above. For example, in some embodiments, electronic system 900 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto. Thus, although specific embodiments have been described, these are not intended to be limiting. Various modifications and equivalents are within the scope of the following claims.

What is claimed is:

1. A system, comprising:
   a systolic array including a plurality of processing elements arranged in at least two dimensions, a first dimension corresponding to rows, and a second dimension corresponding to columns, wherein inputs to the systolic array include a separate input stream of input values at each column; and
   a clock distribution network through which a root clock signal is distributed to the plurality of processing elements, wherein the clock distribution network includes a clock gate controller, and wherein the clock gate controller is configured to:
   pass the root clock signal as a gated clock signal from which local clock signals are derived for processing elements in a first column of the systolic array,
   at each clock cycle, check whether a most recent value input to the first column from a corresponding input stream is zero, and
   disable the gated clock signal based on detecting that the most recent value input to the first column is zero.

2. The system of claim 1, wherein the input stream of the first column is padded with one or more leading zeros.

3. The system of claim 2, wherein for each leading zero in the input stream of the first column, an input stream of each successive column after the first column is also padded at a corresponding position with a leading zero.

4. The system of claim 1, wherein the input stream of the first column includes weights of a neural network.

5. The system of claim 1, wherein the input stream of the first column includes activations of a neural network.

6. The system of claim 1, wherein the plurality of processing elements is configured to perform operations corresponding to a convolution layer of a neural network.

7. The system of claim 1, wherein the clock gate controller is further configured to:
   disable the gated clock signal before any values are received at the input stream of the first column, and
   keep the gated clock signal disabled until a non-zero value is received at the input stream of the first column, the non-zero value being an initial value in a sequence of non-zero values.

8. The system of claim 1, wherein the clock gate controller is further configured to:
   enable the gated clock signal in response to detecting a non-zero value at the input stream of the first column, and
   keep the gated clock signal enabled until an end of a computation being performed by the systolic array.

9. The system of claim 1, wherein the clock gate controller includes a state machine implemented using combinational logic.

10. The system of claim 1, wherein each processing element in the first column is configured to perform a multiply-accumulate operation in which a first value is multiplied by a second value, and wherein the first value is sequentially shifted through the processing elements in the first column.

11. The system of claim 1, wherein each processing element in the first column includes processing circuitry and a plurality of storage registers, wherein each storage register is controlled by a local clock signal of the processing element, and wherein the processing circuitry operates independently of the local clock signal.

12. The system of claim 1, wherein the clock distribution network includes a separate clock gate controller for each column of the systolic array, each clock gate controller being configured to pass the root clock signal as a respective gated clock signal.

13. The system of claim 1, wherein at least some processing elements of the plurality of processing elements include a local clock gate controller, and wherein the local clock gate controller is configured to disable a local clock signal of the processing element based on detecting a zero value at a row input of the processing element.

14. The system of claim 1, wherein:
the systolic array is configured to sequentially shift each input stream through a respective column to update a first input of a processing element in the respective column,
the processing element in the respective column is configured to compute an output value using a value of the first input and a value of a second input, and
the processing element in the respective column is configured to retain at least one of the output value or the value of the second input for use in computing a subsequent output value based on an updated value of the first input.

15. A method, comprising:
receiving, by a clock gate controller in a clock distribution network, a root clock signal to be distributed to a plurality of processing elements in a systolic array, wherein the plurality of processing elements is arranged in at least two dimensions, a first dimension corresponding to rows, and a second dimension corresponding to columns, and wherein inputs to the systolic array include a separate input stream of input values at each column;
passing, by the clock gate controller, the root clock signal as a gated clock signal from which local clock signals are derived for processing elements in a first column of the systolic array;
checking, by the clock gate controller at each clock cycle, whether a most recent value input to the first column from a corresponding input stream is zero, and
disabling, by the clock gate controller, the gated clock signal based on detecting that the most recent value input to the first column is zero.

16. The method of claim 15, wherein the input stream of the first column is padded with one or more leading zeros.

17. The method of claim 15, further comprising:
disabling, by the clock gate controller, the gated clock signal before any values are received at the input stream of the first column, and
keeping the gated clock signal disabled until a non-zero value is received at the input stream of the first column, the non-zero value being an initial value in a sequence of non-zero values.

18. The method of claim 15, further comprising:
enabling, by the clock gate controller, the gated clock signal in response to detecting a non-zero value at the input stream of the first column, and
keeping the gated clock signal enabled until an end of a computation being performed by the systolic array.

19. The method of claim 15, wherein the disabling of the gated clock signal and a subsequent reenabling of the gated clock signal are performed using combinational logic of the clock gate controller.

20. The method of claim 15, wherein the plurality of processing elements is configured to perform operations corresponding to a convolution layer of a neural network.

* * * * *